United States Patent
Trundle

(10) Patent No.: US 9,978,240 B1
(45) Date of Patent: *May 22, 2018

(54) SYSTEM AND PROCESS FOR DISTRIBUTED NETWORK OF REDUNDANT CENTRAL STATIONS

(71) Applicant: Alarm.com Incorporated, Tysons, VA (US)

(72) Inventor: Stephen Scott Trundle, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/590,147

(22) Filed: May 9, 2017

Related U.S. Application Data

(63) Continuation of application No. 15/069,517, filed on Mar. 14, 2016, now Pat. No. 9,652,971.

(Continued)

(51) Int. Cl.
*G08B 21/02* (2006.01)
*H04L 12/24* (2006.01)
(Continued)

(52) U.S. Cl.
CPC .......... *G08B 21/0261* (2013.01); *G06F 8/71* (2013.01); *G06F 9/44536* (2013.01);
(Continued)

(58) Field of Classification Search
CPC ................ G08B 21/0261; G08B 13/08; G08B 21/0275; G08B 21/0255; G08B 13/19697;
(Continued)

(56) References Cited

U.S. PATENT DOCUMENTS

| | | | | | |
|---|---|---|---|---|---|
| 107,277 A | * | 9/1870 | Merrill | ...................... | F23D 3/00 431/302 |
| 114,429 A | * | 5/1871 | Fontaine | ................. | F01K 11/04 188/186 |

(Continued)

OTHER PUBLICATIONS

U.S. Non-Final Office Action for U.S. Appl. No. 15/069,517 dated Mar. 3, 2017, 8 pages.

(Continued)

*Primary Examiner* — Fekadeselassie Girma
(74) *Attorney, Agent, or Firm* — Fish & Richardson P.C.

(57) ABSTRACT

Techniques are described for distributing, to a distributed network of central stations, alarm events detected in monitoring system data collected by sensors included in monitoring systems located at monitored properties. A system receives monitoring system data collected by sensors included in monitoring systems located at monitored properties, tracks alarm events detected within the monitoring system data, and generates, for central station servers in a distributed network of central stations, load profiles that reflect a volume of alarm events being handled at each of the central station servers at a particular period of time. The system determines capacities to handle additional alarm events for the central station servers, determines relative priorities for the central station remote servers based on the determined capacities, and directs subsequent alarm events to the central station servers based on the relative priorities.

20 Claims, 8 Drawing Sheets

Related U.S. Application Data

(60) Provisional application No. 62/132,419, filed on Mar. 12, 2015.

(51) Int. Cl.
  *G08B 13/08* (2006.01)
  *G08B 13/196* (2006.01)
  *H04L 12/66* (2006.01)
  *G06F 9/44* (2018.01)
  *G06F 9/445* (2018.01)
  *G06F 9/50* (2006.01)

(52) U.S. Cl.
  CPC ............. *G06F 9/505* (2013.01); *G08B 13/08* (2013.01); *G08B 13/19697* (2013.01); *G08B 21/0227* (2013.01); *G08B 21/0255* (2013.01); *G08B 21/0275* (2013.01); *H04L 12/66* (2013.01); *H04L 41/0213* (2013.01); *H04L 41/0816* (2013.01); *H04L 41/50* (2013.01)

(58) Field of Classification Search
  CPC ..... G08B 21/0227; H04L 41/50; H04L 12/66; H04L 41/0213; H04L 41/0816; H04L 41/0893; H04L 45/00; G06F 8/71; G06F 9/44536; G06F 9/505
  See application file for complete search history.

(56) References Cited

U.S. PATENT DOCUMENTS

| | | | | |
|---|---|---|---|---|
| 128,002 A * | 6/1872 | Whitock | ................. | B61F 15/06 384/191.2 |
| 5,812,768 A * | 9/1998 | Page | ...................... | G06F 9/546 709/217 |
| 7,221,646 B2 * | 5/2007 | Kawano | .............. | H04L 41/0826 370/218 |
| 8,477,600 B2 * | 7/2013 | Yong | ...................... | H04L 45/00 370/217 |
| 8,782,282 B1 * | 7/2014 | Zhou | ...................... | H04L 41/50 709/203 |
| 8,855,682 B2 * | 10/2014 | Osann, Jr. | ............... | H04M 1/67 455/418 |
| 9,510,152 B2 * | 11/2016 | Weiss | .................... | H04W 4/027 |
| 9,652,971 B1 * | 5/2017 | Trundle | ............... | G08B 25/005 |
| 2004/0040030 A1 * | 2/2004 | Fenton | ..................... | G06F 8/71 719/320 |
| 2004/0107049 A1 * | 6/2004 | White | .................... | G01S 19/14 701/469 |
| 2004/0107277 A1 * | 6/2004 | Levesque | ................. | H04L 41/082 709/223 |
| 2005/0103767 A1 * | 5/2005 | Kainec | ..................... | B23K 9/10 219/130.5 |
| 2005/0114429 A1 * | 5/2005 | Caccavale | ............... | G06F 9/505 709/200 |
| 2011/0034183 A1 * | 2/2011 | Haag | ...................... | G06Q 50/26 455/456.3 |
| 2015/0156567 A1 * | 6/2015 | Oliver | .................... | H04W 4/80 340/870.07 |
| 2017/0193724 A1 * | 7/2017 | Johnson | ................. | G08B 13/08 |
| 2017/0243455 A1 * | 8/2017 | Johnson | ............. | E05B 47/0012 |

OTHER PUBLICATIONS

U.S. Notice of Allowance for U.S. Appl. No. 15/069,517 dated Apr. 5, 2017, 7 pages.

\* cited by examiner

SYSTEM AND PROCESS FOR DISTRIBUTED NETWORK OF REDUNDANT CENTRAL STATIONS

CROSS-REFERENCE TO RELATED APPLICATIONS

This application is a continuation of U.S. application Ser. No. 15/069,517, filed on Mar. 14, 2016, which claims the benefit of U.S. Application Ser. No. 62/132,419, filed on Mar. 12, 2015, each of the prior applications being incorporated by reference in their entirety.

TECHNICAL FIELD

This disclosure relates to monitoring technology and, for example, creating redundancy by using a distributed network of affiliated central stations.

BACKGROUND

Central stations receive information from monitoring systems (e.g., in-home alarm or security systems) and handle dispatching emergency services based on critical information sensed by the monitoring systems. Central stations may monitor a large number of user accounts in which case system failures may adversely impact performance of individual monitoring systems and reduce the safety offered by the monitoring systems. Techniques for directing monitoring data traffic can include redundantly operating multiple central stations by creating distributed networks of affiliated central stations to monitor a large number of user accounts.

SUMMARY

Techniques are described for improving the operability of monitoring (e.g., alarm or security) systems by creating a distributed network of affiliated central stations. Central stations receive information from monitoring systems (e.g., in-home alarm or security systems) and handle dispatching emergency services based on critical information sensed by the monitoring systems. Central stations may monitor a large number of user accounts in which case system failures may adversely impact performance of individual monitoring systems and reduce the safety offered by the monitoring systems. In addition, single central stations may be unable to handle large volume of calls related to alarm events without disrupting operation. To help increase reliability of central stations, techniques are described to redundantly operate multiple central stations by creating distributed networks of affiliated central stations to monitor a large number of user accounts. Central stations typically work with monitoring systems, but the techniques described throughout this disclosure may be applied to any type of monitoring device, such as life-support monitoring equipment, emergency medical monitoring equipment, standalone fire sensors, standalone carbon-monoxide sensors, etc.

In some implementations, a system for distributing, to a distributed network of central stations, alarm events detected in monitoring system data collected by sensors included in monitoring systems located at monitored properties, includes a server. The server includes at least one processor and at least one computer-readable storage medium coupled to the at least one processor having stored thereon instructions which, when executed by the at least one processor, causes the at least one processor to perform operations. The operations include receiving monitoring system data collected by sensors included in monitoring systems located at monitored properties and tracking alarm events detected within the monitoring system data collected by the sensors included in the monitoring systems located at the monitored properties. The operations further include generating, for central station servers in a distributed network of central stations, load profiles that reflect a volume of alarm events being handled at each of the central station servers at a particular period of time. The operations include determining, based on the generated load profiles and for the central station servers in the distributed network of central stations, capacities to handle additional alarm events and determining relative priorities for the central station remote servers based on the determined capacities. The operations conclude with directing subsequent alarm events to the central station servers based on the determined relative priorities.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

Figure 1:
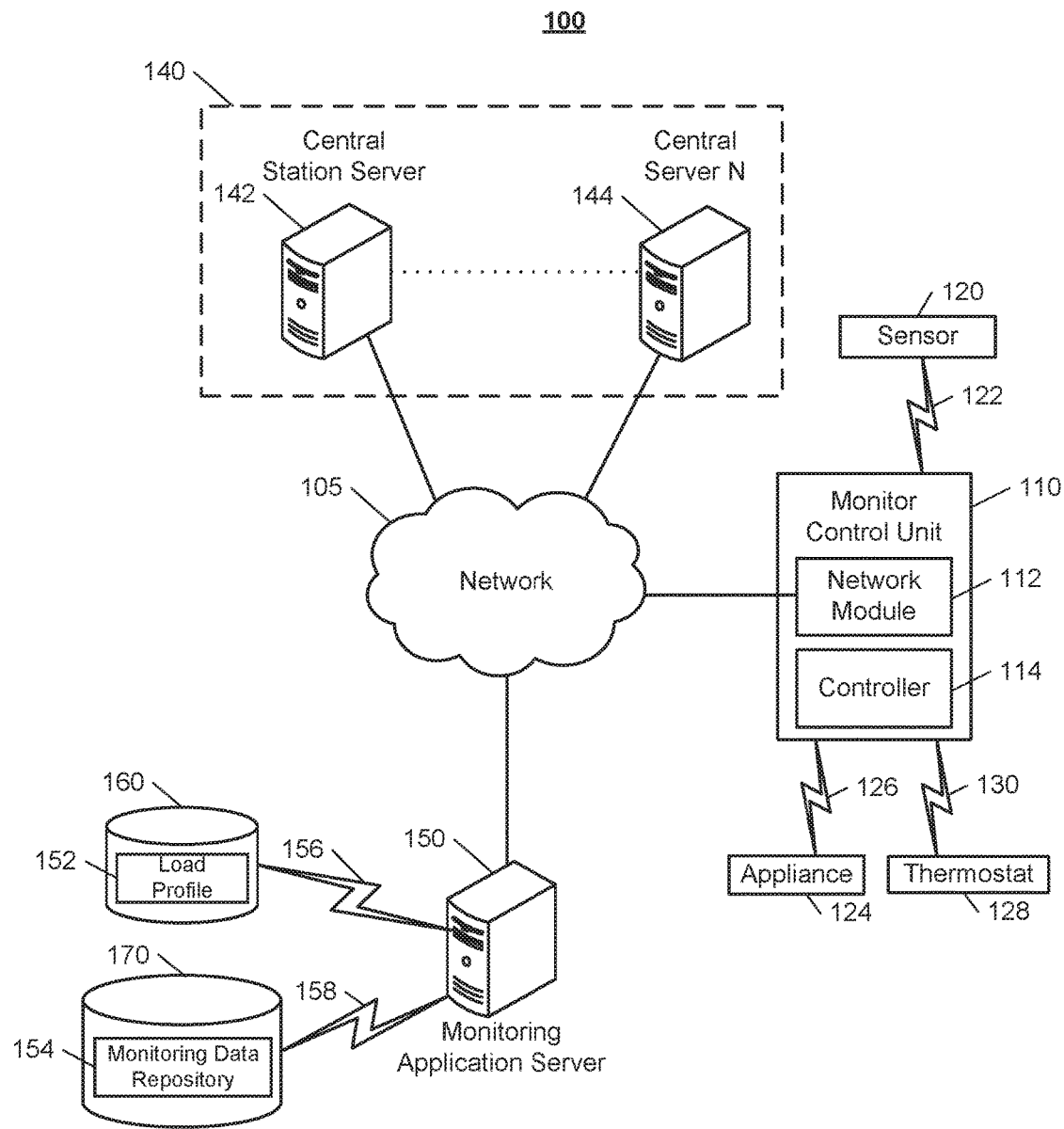
FIGS. 1 and 4 illustrate example systems for creating redundancy using a distributed network of central station servers.

FIG. 1 illustrates an example of an electronic system 100 configured to redundantly operate multiple central stations using distributed networks of affiliated central stations. The electronic system 100 includes a network 105, a monitoring system control unit 110, a distributed station network 140, and a monitoring application server 150. In some examples, the network 105 facilitates communication between the monitoring system control unit 110, central station servers 142 and 144, and the monitoring application server 150.

The network 105 is configured to enable exchange of electronic communications between devices connected to the network 105. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. The network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a network module 112 and a controller 114. The controller 114 is configured to control a monitoring system (e.g., a home alarm or security system) that includes the monitoring system control unit 110. In some examples, the controller 114 may include a processor or other control circuitry configured to execute instructions of a program that controls operation of an alarm system. In these examples, the controller 114 may be configured to receive input from sensors, detectors, or other devices included in the alarm system and control operations of devices included in the alarm system or other household devices (e.g., a thermostat, an appliance, lights, etc.). For example, the controller 114 may be configured to control operation of the network module 112 included in the monitoring system control unit 110.

The monitoring system control unit 110 may be configured to receive input from one or more sensors or detectors 120. For example, the monitoring system control unit 110 may be configured to receive data from multiple sensors 120. The sensors 120 may include a contact sensor, a motion sensor, a glass break sensor, or any other type of sensor included in an alarm system or a security system. The sensors 120 may also include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors may include a radio-frequency identification (RFID) sensor that identifies a particular article that includes a pre-assigned RFID tag. In addition, the sensors 120 may include a video/photographic camera or other type of optical sensing device configured to capture images and may include an energy consumption sensor for appliances and devices in a property monitored by the monitoring system.

The monitoring system control unit 110 communicates with modules 124 and 128 and sensors 120 to perform system monitoring and control. The module 124 is connected to one or more appliances, is configured to monitor activity of the one or more devices, and is configured to control operation of the one or more appliances. The module 124 may directly measure activity of the one or more appliances or may estimate activity of the one or more appliances based on detected usage of the one or more appliances. The module 124 may communicate energy monitoring information to the monitoring system control unit 110 and may control the one or more appliances based on the commands received from the monitoring system control unit 110.

The module 128 is connected to a thermostat, is configured to monitor temperature of a temperature regulation system associated with the thermostat, and is configured to control operation of the thermostat. The module 128 may directly measure activity of the temperature regulation system associated with the thermostat or may estimate activity of the temperature regulation system associated with the thermostat based on the detected temperature of the temperature regulation system associated with the thermostat. The module 128 also may determine energy usage information based on the activity, communicate energy monitoring information to the monitoring system control unit 110, and control the thermostat based on commands received from the monitoring system control unit 110.

The modules 124, 128, and sensors 120 communicate with the control 112 over communication links 122, 126, and 130, respectively. The communication links 122, 126, and 130 may be a wired or wireless data pathway configured to transmit signals from the modules 124, 128, and sensors 120 to the controller 112. The modules 124, 128, and sensors 120 may continuously transmit sensed values to the controller 112, periodically transmit sensed values to the controller 112, or transmit sensed values to the controller 112 in response to a change in a sensed value.

The network module 112 is a communication device configured to exchange communications over the network 105. The network module 112 may be a wireless communication module configured to exchange wireless communications over the network 105. For example, the network module 112 may be a wireless communication device configured to exchange communications over a wireless data channel and a wireless voice channel. In this example, the network module 112 may transmit monitoring data over a wireless data channel and establish a two-way voice communication session over a wireless voice channel. The wireless communication device may include one or more of an LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 112 also may be a wired communication module configured to exchange communications over the network 105 using a wired connection. For instance, the network module 112 may be a modem, a network interface card, or another type of network interface device. The network module 112 may be an Ethernet network card configured to enable the monitoring system control unit 110 to communicate over a local area network and/or the Internet. The network module 112 also may be a voiceband modem configured to enable the alarm panel to communicate over the telephone lines of Plain Old Telephone Systems (POTS).

The distributed station network 140 includes multiple central stations 132 and 134 that operate independently and are connected over the network 105. The distributed station network 140 may include many more central stations than illustrated in FIG. 1. The multiple central station servers 142 and 144 are electronic devices configured to provide alarm monitoring services by exchanging communications with the monitoring system control unit 110, and/or the monitoring application server 150 over the network 105. For example, the multiple central station servers 142 and 144 may be configured to monitor alarm events generated by the monitoring system control unit 110. In this example, the multiple central station servers 142 and 144 may exchange communications with the network module 114 included in the monitoring system control unit 110 to receive information regarding alarm events detected by the monitoring system control until 110. The multiple central station servers 142 and 144 also may receive information regarding alarm events by the monitoring application server 150.

The multiple central stations servers 142 and 144 perform monitoring operations independently from one another with different monitoring system control units over the network 105. For example, the multiple central station servers 142 and 144 may monitor monitoring system control units within different locations and also may be operated by different companies that are not affiliated. In such examples, the multiple central station servers 142 and 144 operate as separate entities within the system 100 and only become affiliated when there is unusually high volumes of monitoring data transmission to one of the multiple central alarm station servers 142 and 144, or there is a failure in one of the central station servers. For instance, the system 100 may redistribute the data transmissions from the central station server 142 to the central station server 144 if it detects potential signal disruptions within the data transmissions to the central station server 142.

The monitoring application server 150 is an electronic device configured to provide monitoring services by exchanging electronic communications with the monitoring system control unit 110 and the multiple central station servers 142 and 144 over the network 105. For example, the monitoring application server 150 may be configured to monitor events (e.g., alarm events) generated by the monitoring system control unit 110. In this example, the monitoring application server 150 may exchange electronic communications with the network module 114 included in the monitoring system control unit 110 to receive information regarding events (e.g., alarm events) detected by the monitoring system control unit 110.

The monitoring application server 150 also exchanges communications with the monitoring system control units 110 of multiple monitoring systems within different properties over the network 105. For example, the system 100 may include multiple monitoring application servers 150 that monitor specified monitoring systems based on properties grouped within certain geographic regions. The monitoring application server 150 may monitor multiple monitoring systems within a certain locality (e.g., one mile radius) using parallel communication networks to reduce the number of data transmissions required to monitor all alarm events generated by one or more monitoring system control units 110.

The monitoring application server 150 stores sensor and image data received from the monitoring system and performs analysis of sensor and image data received from the monitoring system. Based on the analysis, the monitoring application server 150 may communicate with and control aspects of the monitoring system control unit 110. The monitoring application server 150 also may store information regarding existing monitoring data transmissions to the multiple central station servers 142 and 144. For example, the monitoring application server 150 may store a load profile 152 based on the volume of prior monitoring data transmitted to the multiple central station servers 142 and 144 connected over the network 105. The monitoring application server 150 also may store a monitoring data repository 154 of minimal data required to process monitoring data from the monitoring system control unit 110 for properties associated with the multiple central station servers 142 and 144.

The load profile 152 and the monitoring data repository 154 may be stored over communication links 156 and 158 in databases 160 and 170, respectively. The communication links 156 and 158 may be a wired or wireless data pathway configured to transmit signals from the monitoring application server 150 to databases that store the load profile 152 and the monitoring data repository 154. The monitoring application server 150 may continuously transmit data to the databases, periodically transmit data based on alarm events detected by the monitoring control unit 110, or in response to a data transmission.

In some implementations, the monitoring application server 150 receives monitoring data from multiple security service providers that maintain in-home security systems within the properties where the monitoring system control units 110 are located. For example, the monitoring data transmitted may be the minimal data required to process monitoring data from the monitoring system control unit 110 for properties associated with the multiple central station servers 142 and 144, such as the emergency contact for the property account or the property address. In this example, the system 100 may store the monitoring data in the monitoring data repository 154 to track properties that experience monitoring events that indicate that the user may require immediate assistance.

In some implementations, the monitoring application server 150 may independently gather property information from security service providers and the collective load of the distributed station network 140 to intelligently redistribute monitoring data transmission between multiple central stations 142 and 144. For example, the system 100 may reroute monitoring data from the central alarm station 142 to another central alarm station 144 within the distributed station network 140 if it determines that the central alarm station 142 is experiencing unusually high volume of monitoring data or is experiencing performance issues.

Figure 2:
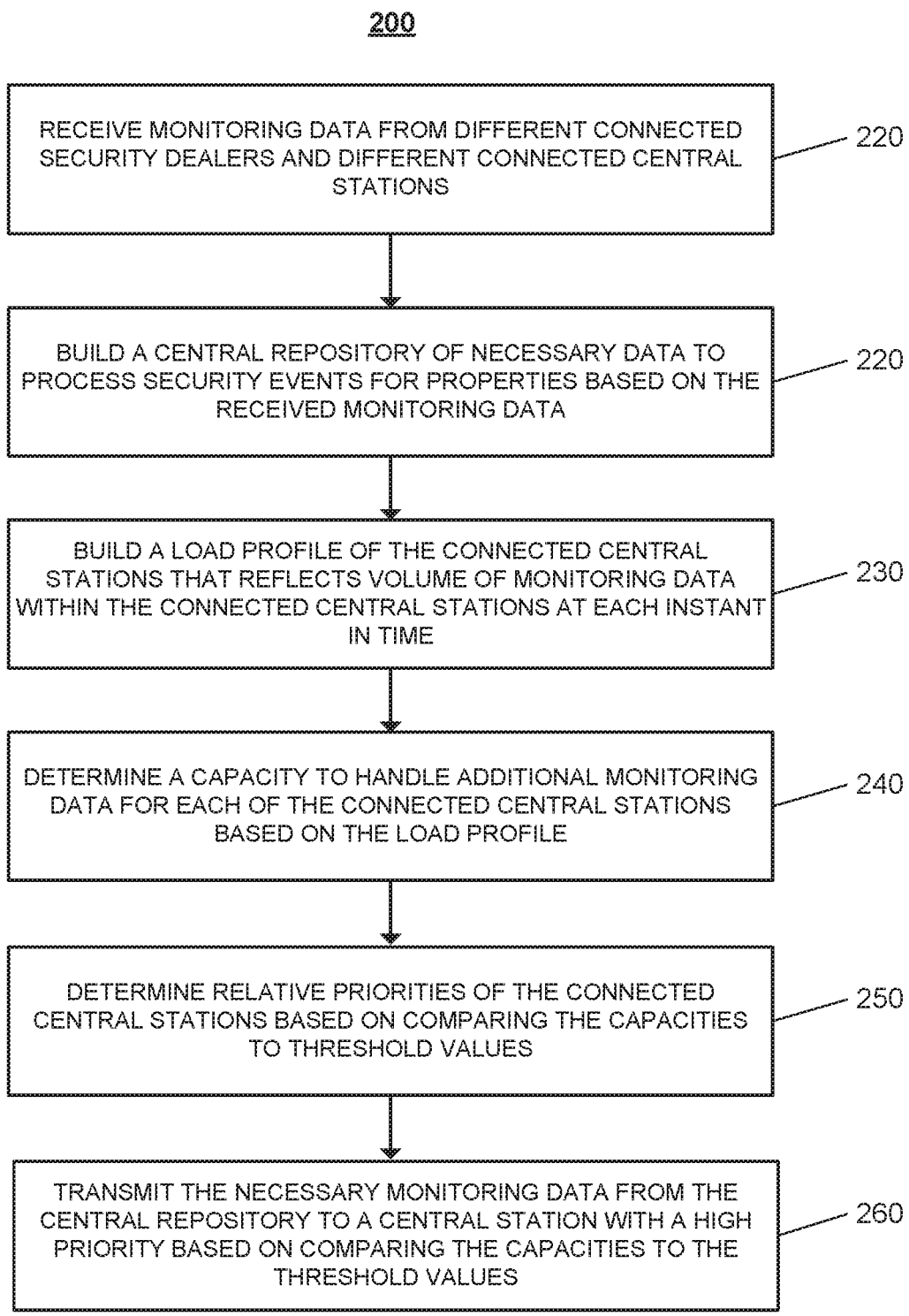
FIGS. 2, 3 7, and 8 are flowcharts illustrating example processes.

FIG. 2 illustrates an example process 200 for transmitting monitoring data between a distributed network of central stations. The operations of the example process 200 are described generally as being performed by the system 100. The operations of the example process 200 may be performed by one of the components of the system 100 (e.g., the monitoring application server 150) or may be performed by any combination of the components of the system 100. In some implementations, operations of the example process 200 may be performed by one or more processors included in one or more electronic devices.

Briefly, the system 100 receives monitoring data from different connected security service providers and different connected central stations (210). The system 100 builds a central repository of necessary data required to process security events for properties based on the received monitoring data (220). The system 100 builds a load profile of the connected central stations that reflects volume of monitoring data within the connected central stations at each instant in time (230). The system 100 determines a capacity to handle additional monitoring data for each of the connected central stations based on the load profile (240). The system 100 determines relative priorities of the connected alarm stations based on comparing the capacities to threshold values (250). Finally, the system 100 transmits the necessary monitoring data from the central repository to a central station with a high priority based on comparing the capacities to the threshold values (260).

The example process 200 begins when the system 100 receives monitoring data from different connected security service providers and different connected central stations (210). For instance, the system 100 may receive monitoring data that identifies attributes of monitoring data generated from an alarm event at the property. The attributes of monitoring data may include status of the sensors within the property, the monitored status of devices within the property, the emergency contact for the property account, or the property address. In this example, the system 100 may store the monitoring data in an appropriate location to track properties that experience alarm events that indicate that the user may require immediate assistance.

For example, the monitoring data may be stored in the monitoring application server 150. In such examples, the monitoring data may be maintained by third-party security providers that perform service and maintenance on the property, but not the alarm system. The monitoring application server 150 may therefore allow alarm system manufacturers to receive access to user information that may be necessary to provide emergency assistance service when there is an alarm event within the property.

In some implementations, the system 100 may use the monitoring data from the monitoring application server 150 to predict the importance of the various monitoring data transmitted by the monitoring system control unit 110. For example, the prediction may include identifying the monitoring data into certain high-priority categories, such as fire alarms, carbon dioxide levels, and other monitoring data into low-priority categories, such as water levels, or broken sensors/equipment. In some implementations, the prediction may involve analyzing alarm frequency within certain properties over fixed time periods (e.g., over a 12 month period) to determine whether high incidence rates indicate a false alarm event. The system 100 may use this analysis to deprioritize potential monitoring data that may not necessarily qualify as necessary monitoring data.

The system 100 builds a central repository of necessary data required to process security events for properties based on the received monitoring data (220). For instance, the system 100 may parse the received monitoring data from multiple security service providers and determine the monitoring data that is essential to process and track the alarm events that may occur within the properties. In this example, the necessary data may include the property address and the emergency contact such that the system 100 may identify and locate the property and transmit the necessary monitoring data to a central station for emergency assistance service.

In some examples, the monitoring application server 150 may build a monitoring data repository 154 based on prior monitoring data from the multiple central station servers 142 and 144 and the monitoring data. In such examples, the monitoring data repository 154 may represent a historical log of prior monitoring data transmitted to the central stations for properties identified by the information from the monitoring data.

The system 100 builds a load profile of the connected central stations that reflects volume of monitoring data within the connected central stations at each instant in time (230). For instance, the system 100 may receive data transmissions from multiple connected central station servers that indicate prior monitoring data transmissions and ongoing data processing operations taking place within the central stations. In such instances, the system 100 may use the data transmissions to track the operations of the connected central station servers and calculate the load profile 152 based on performance parameters, such as CPU usage, memory usage, CPU usage history, physical memory usage history, and capacity of operators to handle alarm events and dispatch emergency services. The system 100 also may analyze the hardware configurations of the central station servers to determine performance thresholds for subsequent monitoring data transmissions.

In some examples, the monitoring application server 150 stores a load profile 152 over a communication link 156 within a database 160. In such examples, the monitoring application server continuously monitors multiple central station servers 142 and 144 and updates the load profile 152 on a reoccurring basis based on the status of the multiple central station servers 142 and 144. For example, the monitoring application server 150 may determine the current load profile 152 and archive the prior load profiles in the database 160 in five minute intervals to determine changes in status of the multiple central station servers 142 and 144.

The system 100 determines a capacity to handle additional monitoring data for each of the connected central stations based on the load profile (240). For instance, the system 100 may receive data transmissions from the central stations with performance indicators that represent its usage by other processes related to other alarm events in other properties or locations. The system 100 may use such data transmissions to calculate how subsequent transmissions of monitoring data may impact the central station and predict the likelihood of generating a prompt emergency service response to the alarm event within a property.

In some examples, the monitoring application server 150 may determine the capacity to handle additional monitoring data for multiple central station servers 142 and 144 based on the load profile 152 and monitoring data repository 154 of the multiple central station servers 142 and 144. In such examples, the monitoring application server 150 may determine the capacity by calculating the resource availability within the multiple central station servers 142 and 144 and a prediction of expected monitoring data volume based on the historical log of the prior monitoring data transmitted to the connected central stations within the monitoring data repository 154. The monitoring application server 150 may further determine when the multiple central station servers 142 and 144 may likely be idle or partly idle based on the load profile 152.

The system 100 determines relative priorities of the connected alarm stations based on comparing the capacities to threshold values (250). For instance, the system 100 may compare the calculated capacity to handle additional monitoring data to determine whether a particular connected central station is identified as a high priority center that may receive subsequent data retransmissions from a failed central station. In such instances, the system 100 may redistribute the monitoring data transmission from the failed central station to a high priority central station based on its capacity to handle additional monitoring data.

For example, the monitoring application server 150 may determine which of the multiple central station servers 142 and 144 has a higher priority based on its capacity to handle additional monitoring data to determine which central station server to send necessary monitoring data redistributed from a central station server that has been identified as experiencing service disturbances.

In some implementations, the system 100 may use the relative capacities of the connected central station servers to determine the more efficient redundant transmission mechanism to multiple central station servers. For example, the system 100 may determine from the load profiles and the capacities to handle additional monitoring data that there are certain central stations that are licensed to the same territory or location and that parallel transmission to them may be effective based on their proximity to one another. In such examples, the system 100 may redirect necessary monitoring data to these specified central stations to maximize transmission speed and minimize errors upon transmission.

In some implementations, the system 100 may determine the relative priorities of the central stations based on subscription services and/or operating costs. For example, larger, more expensive central stations may be used to redistribute monitoring data from properties that agree to a higher price per signal costs based on their subscription. In such instances, the relative priorities of the central stations may be determined based on the specific user subscriptions of the monitoring data that needs to be redistributed. For example, if a property is subscribed to premium alarm system service, then the monitoring data generated by the property may only be transmitted to the high priority central station systems, whereas the monitoring data from a property that is subscribed to minimal alarm services may be transmitted to low or medium priority alarm stations.

The system 100 transmits the necessary monitoring data from the repository to a central station with a high priority based on comparing the capacities to the threshold values (260). For instance, the system 100 may redistribute monitoring data from a temporary location within the monitoring application server 150 to central servers 142, 144.

In some implementations, the necessary monitoring data may be transmitted to more than one high priority central station based on a load-balance configuration between the connected central stations even without a failed central station. For example, the system 100 may determine, based on the capacity to handle additional monitoring data that redistributing the monitoring data to multiple central stations may be more advantageous than transmission to the original central station. In such examples, although the original central station may remain functional, the system 100 may determine that it is necessary to expedite the monitoring data based on the severity of the alarm event within the property that generates it. The system 100 may subsequently transmit the monitoring data in specific loads to multiple central stations connected to the same network to increase transmission speed and reduce processing speed by utilizing the processing powers of the multiple central stations.

In some implementations, the system 100 may determine the load distribution for the necessary monitoring data to be transmitted based on real-time utilization reports generated from the central stations instead of a load profile 152 of all connected central systems. For example, the utilization reports may be transmitted to the application monitoring server, to perform trend analysis on which transmission to a combination of central stations may be most advantageous for redistributing the necessary monitoring data. In such examples, the system application monitoring server may consider transmission latencies based on the proximities between the connected central stations, the success rate of prior transmissions as indicated on the utilization report, and hardware configurations that support parallel data processing procedures to expedite redistributing.

Figure 3:
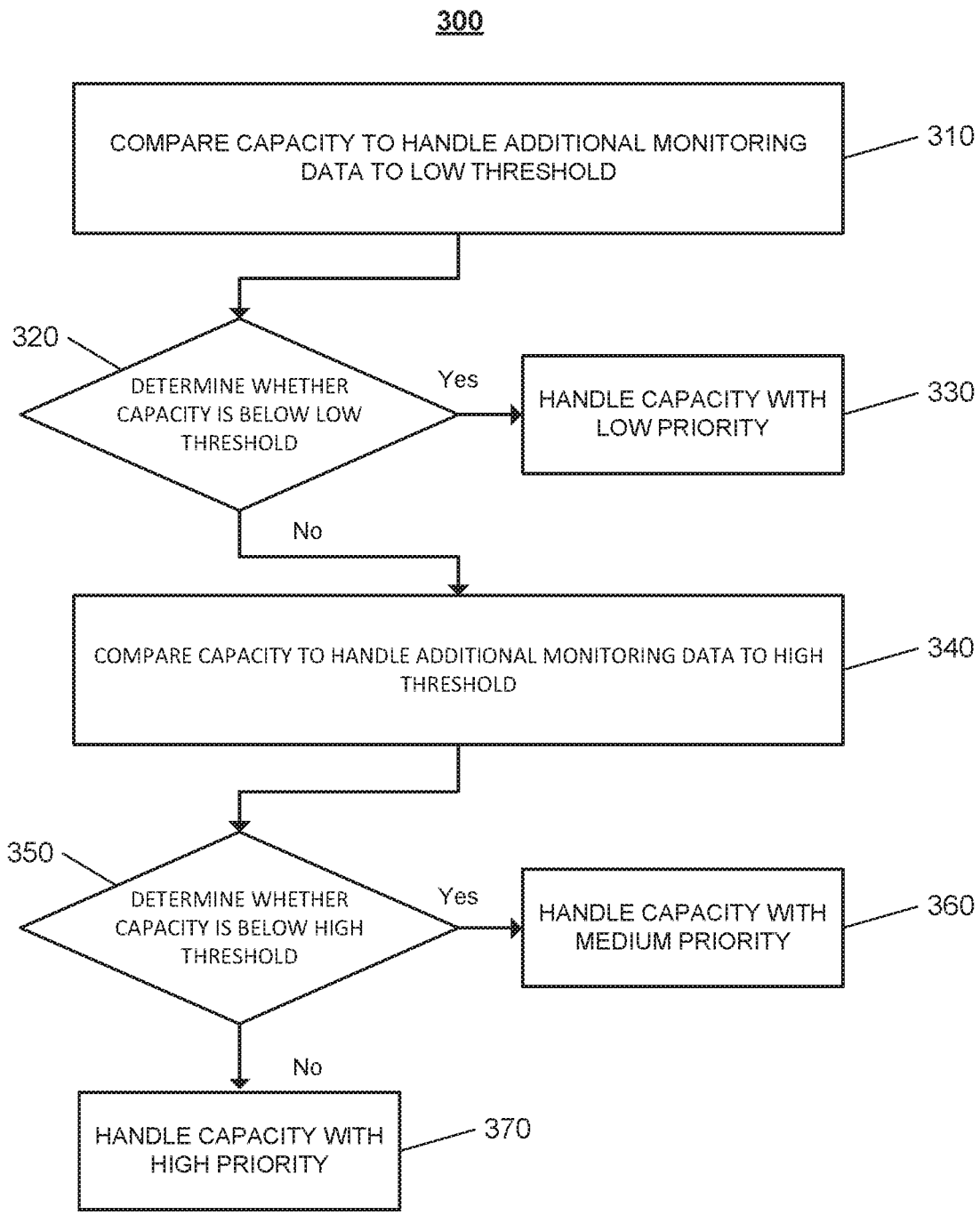

FIG. 3 illustrates an example process 300 for determining the priority for a central station to transmit monitoring data. The process 300 determines a priority for a connected central station by comparing the capacity to handle additional monitoring data for the connected central stations to two thresholds to assign the central station with one of a low, medium, or high priority.

The process 300 begins by comparing the capacity to handle additional monitoring data to a low threshold (310). For example, a first, low threshold may have a value of 25% and the system 100 may compare a determined capacity to handle additional monitoring data to the 25% threshold. The system 100 may determine whether the capacity is below the low threshold (320). For example, a central station may have been determined to have a capacity to handle additional monitoring data at 10%, and the system 100 may determine whether the capacity value of 10% is below the threshold of 25%. If the capacity is below the low threshold, the central station is handled with a low priority (330), where the process 300 then ends.

If the determined capacity to handle additional monitoring data meets the low threshold, the system 100 compares the capacity value compares the capacity to a second, high threshold (340). For example, a second, high threshold may have a value of 75% and the system 100 may compare the determined alarm probability score associated with the alarm event to the 75% threshold. The system 100 may determine whether the alarm probability score is below the high threshold (750). For example, a central station may have been determined to have a capacity of 90%, and the system 100 may determine whether the capacity value of 90% is below the high threshold of 75%. If the alarm probability score is below the high threshold, the connected central station is handled with medium priority (340), where the process 300 then ends. Alternatively, if the determined capacity value is not below the high threshold, the system 100 handles the connected central station with high priority (370). After the connected central station has been handled with one of a medium or a high priority, the process 300 ends.

Figure 4:
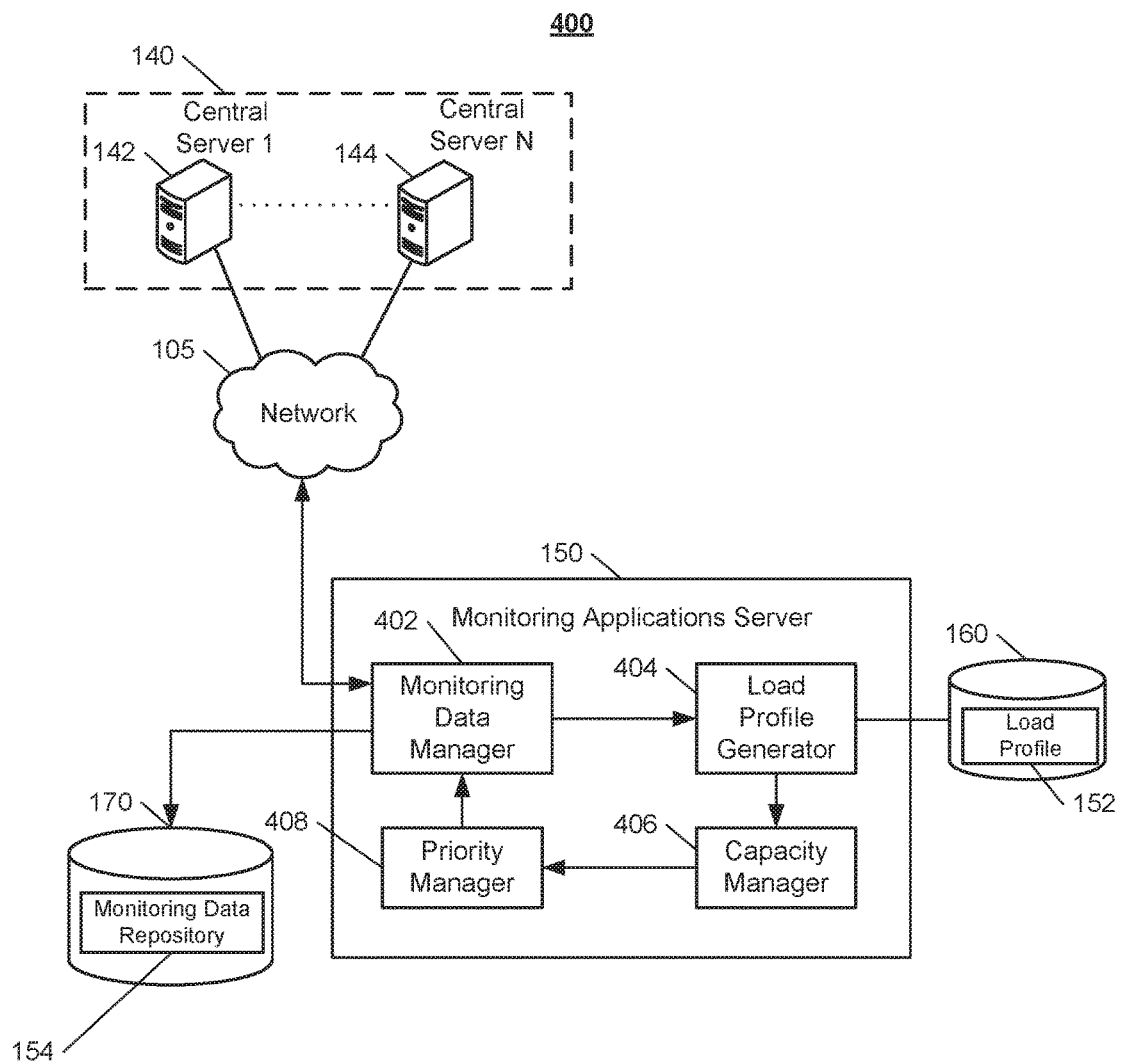

FIG. 4 illustrates an example of an electronic system 400 configured to redundantly leverage multiple central stations using distributed networks of affiliated central stations. The electronic system 400 can be an implementation of the electronic system 100, and is shown to include many of the same components that function in the same ways as in the electronic system 100. The electronic system 400 includes a network 105, a distributed station network 140, and a monitoring application server 150.

The monitoring application server 150 includes a monitoring data manager 402, a load profile generator 404, a capacity manager 406, and a priority manager 408. The monitoring data manager 402 is configured to receive, transmit, and/or direct monitoring data traffic. The monitoring data manager 402 receives monitoring data from the network 105. In some examples, the monitoring data manager 402 gathers monitoring data (e.g., door open, alarm event, etc.) from a network of properties (e.g., a network of monitoring system control units 110 in FIG. 1, although only one is depicted in FIG. 1).

The monitoring application server 150 processes the monitoring system data from the monitored properties and then alerts a central station in the event of an alarm that could be in need of emergency services. The central stations receive monitoring data from the monitoring application server 150. While the monitoring application server 150 gets data from the central stations, it relates to resolution of alarm events dispatched to the central stations and, potentially, data on load.

The monitoring data manager 402 can include a processor or other control circuitry configured to execute instructions of a program that processes and controls data traffic. The monitoring data manager 402 can include transceiver components configured to transmit or receive data from network 105. In some examples, the monitoring data manager 402 communicates directly with the distributed station network 140 and/or its components (e.g., central station servers 142 and 144).

The monitoring data manager 402 can build a central repository of monitoring data. In some examples, the monitoring data manager 402 creates the monitoring data repository 154 and stores it in database 170. The monitoring data manager 402 can receive communications from the priority manager 408. In some examples, the communications include instructions for directing data traffic to the distributed station network 140.

The monitoring data manager 402 can process received monitoring data to identify security events (e.g., someone has entered the house, a window has been left open, etc.) In some examples, the monitoring data manager 402 identifies the security events, flags, or otherwise marks them. In some implementations, the monitoring data manager 402 identifies the security events and stores the events in a database (e.g., the database 170). The monitoring data manager 402 can transmit, to the load profile generator 404, the monitoring data or a subset of the monitoring data related to alarm events dispatched to the distributed station network 140.

The load profile generator 404 is configured to receive and process monitoring data to generate a load profile for each central station server of the distributed station network 140. The load profile generator 404 can include a processor or other control circuitry configured to execute instructions of a program that generates load profiles (e.g., load profiles 152). The load generator 404 can store the load profiles 152 in a database (e.g., database 160). In some examples, the load profile generator 404 generates a graphical representation of the load profiles 152.

The load profiles 152 can represent a volume of monitoring data being handled by each central station server (e.g., the central station servers 142 and 144). In some examples, the load profiles 152 are generated for a period of time. The period of time can be predetermined, input by a user, or determined by the electronic system 400. The load profile generator 404 can transmit the load profiles 154 to the capacity manager 406.

The capacity manager 406 is configured to determine a capacity to handle additional monitoring data for each central station server of the distributed station network 140. The capacity manager 406 uses the load profiles 152 generated by the load profile generator 404 to determine the capacities for each central station server. In some examples, determining a capacity includes calculating a resource availability in each of the central station servers (e.g., central station servers 142 and 144). The capacity manager 406 can generate a prediction of the volume of expected monitoring data based on historical log data (e.g., from the monitoring data repository 154). In some examples, the monitoring data manager 402 generates the predictions. The capacity manager 406 can transmit the capacities for each central station server to the priority manager 408.

The priority manager 408 is configured to determine a relative priority for each central station server of the distributed station network 140. The priorities are relative to each of the other central station servers, and can indicate the order in which traffic is directed to each server. In some examples, determining the relative priorities includes comparing the capacities to thresholds. The thresholds can be predetermined, input by a user, or determined dynamically by the electronic system 400. For example, if a flood is triggering alerts in many security systems in the same area, a lower threshold for capacity to handle additional monitoring data can be lowered to accommodate for the increase in traffic throughout the distributed station network 140.

In some examples, the priorities for each central station server are determined based on server characteristics such as cost, efficiency, reliability, speed, etc. For example, if three central station servers are available with the same base priorities, the priority manager 408 can look at other properties of the servers. In this example, one server is twice as fast as the other two, but is twice as expensive. A second server is moderately priced and is the most reliable of the three. A third server is the least expensive, transmits and processes at the same speed as the second server, but is not as reliable as the second server. The priority manager 408 can evaluate all server characteristics provided and prioritize the servers relative to each other.

The priority manager 408 can update, set, and remove priorities for central station servers of the distributed station network 140. The priority manager 408 transmits the determined priorities to the monitoring data manager 402. The monitoring data manager 402 uses the priorities to direct monitoring data traffic to the distributed station network 140. In some examples, the monitoring data manager 402 directs traffic by communicating instructions through the network 105 to the distributed station network 140. In some implementations, the monitoring data manager 402 communicates directly with the central station servers 142 and 144 to direct alarm events to the central stations 142 and 144.

In some examples, the electronic system 400 monitors and directs data traffic for each central station server of the distributed station network 140. The electronic system 400 also may direct data traffic for fewer than all central station servers of the distributed station network 140.

Figure 5:
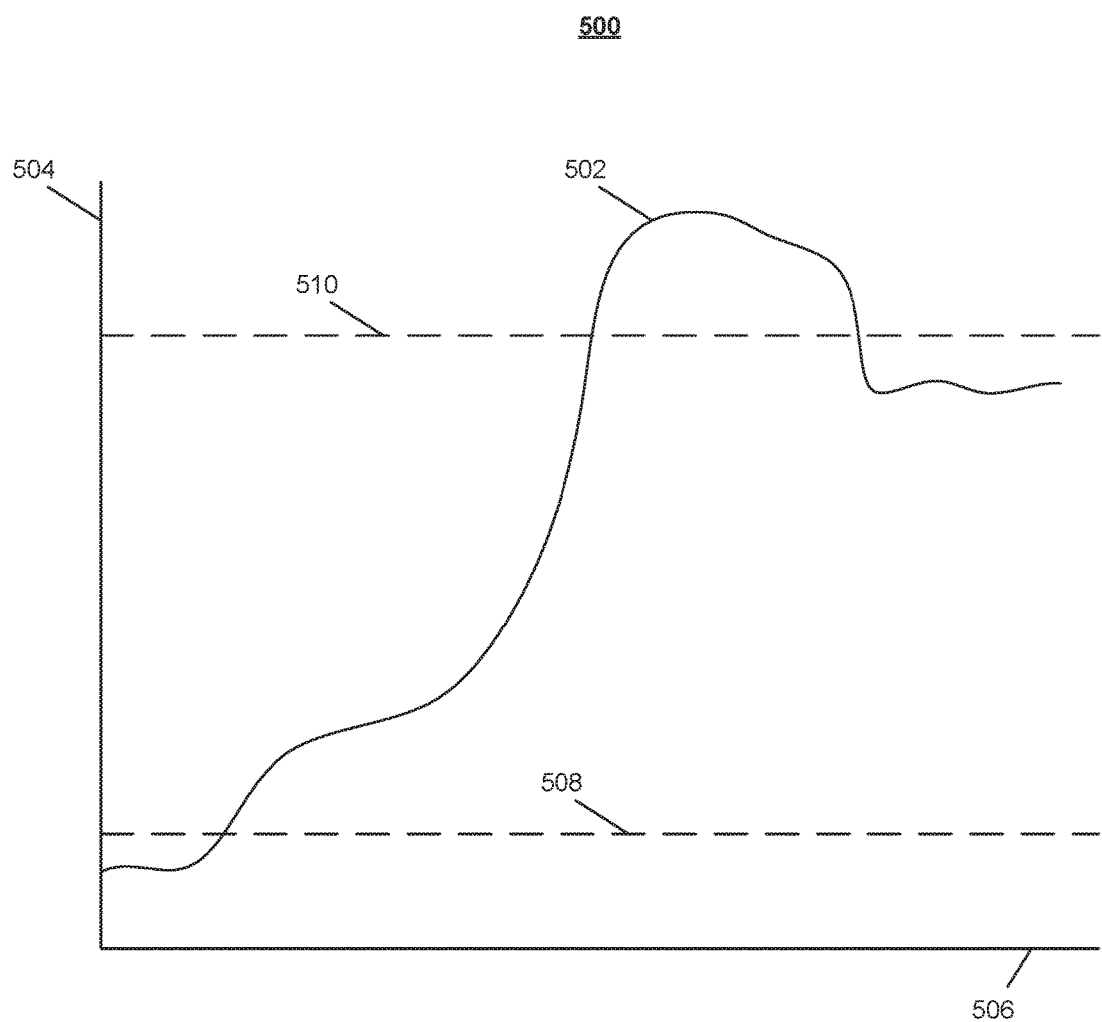
FIG. 5 illustrates an example load profile.

FIG. 5 illustrates an example graphical representation of a load profile 500 that represents the volume of monitoring data being handled by a central station server over a period of time. The graphical representation of the load profile 500 includes a load profile 502, a load axis 504, a temporal axis 506, an upper additional capacity threshold 508, and a lower additional capacity threshold 510. In some examples, the graphical representation of the load profile 500 can display more than one load profile 502. The load profile 502 can be an example of the load profile 152.

The load axis 504 can represent the units of load each central station server is under. The temporal axis 506 can represent the units of time at which each point of the load profile 502 is determined, predicted, or measured. In some examples, the temporal axis 506 can extend beyond the present time to display predicted load included in the load profile 502. In addition, the load profile 502 may display only historical data. The graphical representation of the load profile 500 can be transmitted to be displayed at a client device. In some examples, the graphical representation of the load profile 500 is not transmitted for display, and is purely for illustrative purposes.

The upper additional capacity threshold 508 and the lower additional capacity threshold 510 can include multiple thresholds. The electronic system (e.g., the electronic system 400) generating the load profile 502 can generate several thresholds to create several priority levels. For example, if the load profile 502 is below the upper additional capacity threshold 508, a corresponding first central station server is experiencing relatively low load, and can handle a higher amount of additional data traffic. If the load profile 502 is between the upper additional capacity threshold 508 and a mid-upper additional capacity threshold, a corresponding second central station server is experiencing a moderately low load, and can handle additional data traffic, but less than the first central station server. If the load profile 502 is above the lower additional capacity threshold 510, a corresponding third central station server is experiencing relatively high load, and cannot handle additional data traffic.

Figure 6:
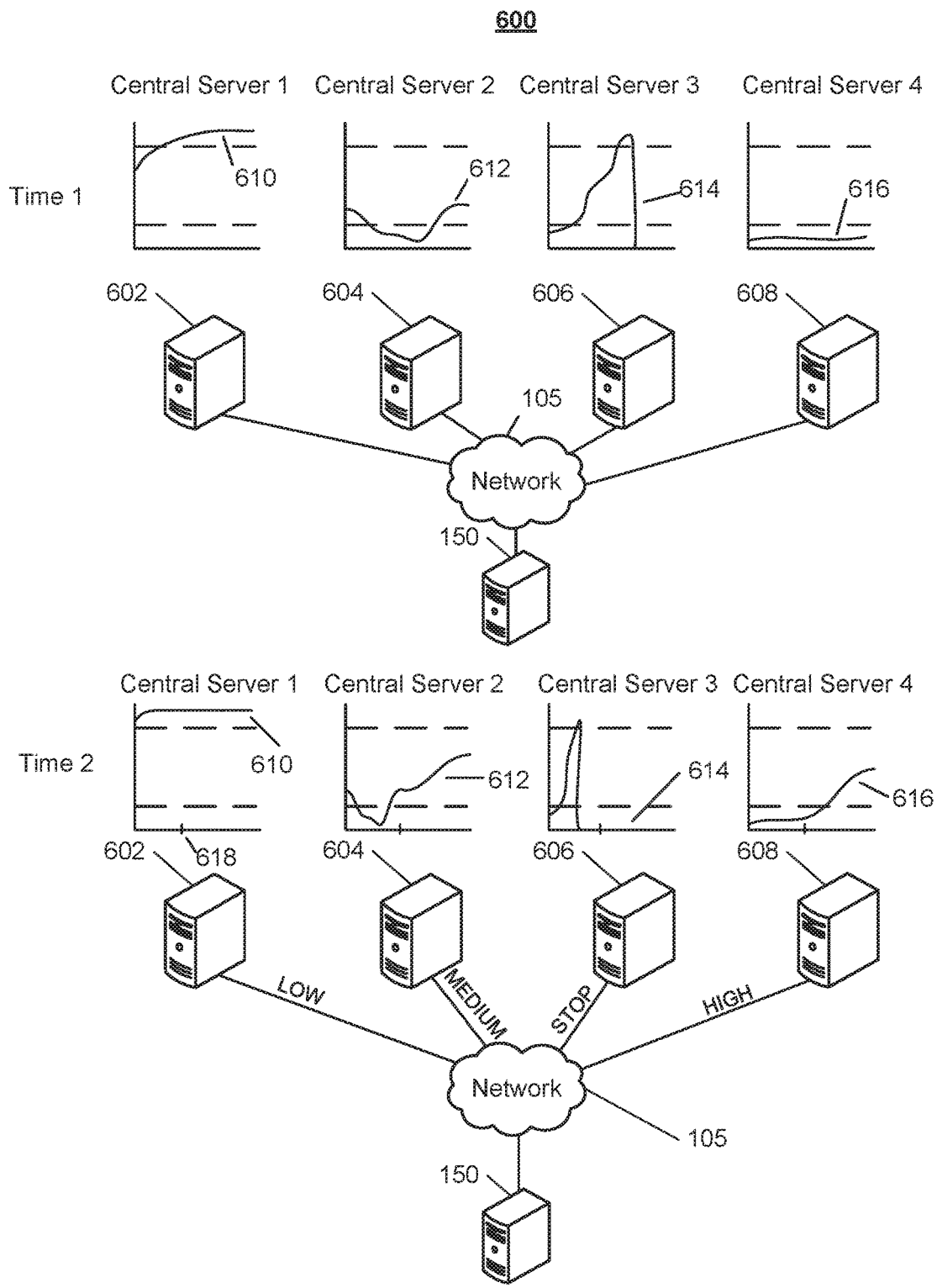
FIG. 6 illustrates a process for redirecting data traffic among the distributed network of central station servers.

FIG. 6 illustrates an example process 600 of evaluating the status of connected central station servers and redirecting monitoring data traffic using the electronic system 400. At a time 1, four central station servers 602, 604, 606, and 608 are in communication with the monitoring application server 150. The central station servers 602, 604, 606, and 608 can communicate with the monitoring application server 150 through the network 105. In some examples, the monitoring application server 150 transmits instructions to the network 105. The network 105 can transmit the instructions to the central station servers 602, 604, 606, and 608 unchanged or processed. Each of the central station servers has a corresponding load profile: load profiles 610, 612, 614, and 616.

The system 400 determines a status of each of the central station servers 602, 604, 606, and 608. In some examples, the system 400 determines a status of the central station servers based on the monitoring data received and the events that have been sent to central station servers for processing. For example, the monitoring data can be received from security systems installed by security dealers in monitored properties. The security systems can transmit the monitoring data to the monitoring application server 150. In some examples, the statuses are determined by the system 400 based on data in the monitoring application server 150's central repository (e.g., repository 154).

In other addition, the central station servers 602, 604, 606, and 608 can periodically send status reports directly to the monitoring application server 150. The monitoring application server 150 can then determine statuses from the received reports. In this case, the monitoring application server 150 may account for capacity being handled by the central station servers that derives from alarm events detected by security systems that do not use the monitoring application server 150.

The system 400 can determine, from the statuses that a server has experienced a failure, is busy, or is otherwise operating atypically. Statuses may be determined based on monitoring data. For example, if the monitoring data is an alarm event that is sent to a central station server, and the central station server does not response, then the system 400 can determine that the status of the central station server is non-operational. In addition, the system 400 can determine that a central station server is currently busy and cannot handle any additional data traffic. The system 400 can determine from a status that a corresponding central station server has gone offline. The system 400 can determine that an adjustment or reevaluation of the alarm data flow is in order.

The load profile 610 of the central station server 602 shows that the central station server 602 is operating above a lower additional capacity threshold, and is therefore unlikely to process additional data traffic effectively or quickly. The load profile 612 of the central station server 604 shows that the central station server 604 is operating between a lower and an upper additional capacity threshold, and can process a moderate level of additional data traffic. The load profile 614 of the central station server 606 shows that the central station server 606 is not processing any data traffic at all, which suggests a failure. The load profile 616 of the central station server 608 shows that the central station server 608 is operating below an upper additional capacity threshold, and is able to process a high level of additional data traffic.

In this example, the lack of data traffic shown by the load profile 614 indicates that there is abnormal activity surrounding the central server 606 and high volume at the central server 602. The abnormal activity can be related to the communication link between the monitoring application server 150 and the central station server 606, the functioning of the central station server 606, etc. For example, the central station server 606 can experience a power outage, preventing it from processing any data directed to it. The high volume at the central server 602 may introduce delay or error in processing further alarm events, but alarm events are being proposed nonetheless.

At a time 2, the central station servers 602, 604, 606, and 608 receive communications from the monitoring application server 150. Axis mark 618 indicates time 1 and is shown on the graphical representations of each of the central station servers 602, 604, 606, 608, highlighting the change in monitoring data traffic between time 1 and time 2.

The system 400 can determine, from the statuses and from comparing the capacities to handle additional monitoring data priority assignments for each of the central station servers 602, 604, 606, and 608. The severity of the monitoring data can affect the priorities for each of the central station servers. For example, if an alert is received with high severity (e.g., a fire in a high occupancy building) the priorities for each server can be adjusted based on the properties of each server. A server with high processing bandwidth but low speed can be given a lower priority based on the severity of the alert. In some examples, cost considerations can affect the priority assignments for the central station servers 602, 604, 606, and 608. For example, some third-party servers can offer lower operating or usage prices.

The priority determinations can be made using comparisons of threshold values to each remote server's capacity to handle additional data traffic as well as the criticality of the data. For example, if an emergency alert is indicated by the monitoring data, the priority assignments for servers can be altered. Alert factors and historical data can be used in determining the priority assignments for the central station servers. For example, historical response time to the type or category of alert can affect the priority assignment of the central station servers. If an alert for a fire and an alert for a burglary are indicated by the monitoring data, priority can be adjusted for the servers to provide the faster response time to the fire alert.

The central station server 602 receives a LOW priority assignment from the monitoring application server 150. In some examples, the priority assignment remains on the monitoring application server 150 and is used by an electronic system (e.g., electronic system 400) to direct traffic. In some implementations, the priority assignment is received by each of the central station servers 602, 604, 606, and 608, which enable the central station servers 602, 604, 606, and 608 to monitor capacity, correct issues, and report errors in the priority classifications made.

The graphical representation of the central station server 602 illustrates the change in data traffic since time 1. The central station server 602 was above the low additional capacity threshold, and was assigned a LOW priority. The central station server 602 did not experience an increase in data traffic between time 1 and time 2, due to its LOW priority.

The central station server 604 receives a MEDIUM priority assignment from the monitoring application server 150. The graphical representation of the central station server 604 illustrates the change in data traffic through the central station server 604 since time 1. The central station server 604 was between the upper additional capacity threshold and the lower additional capacity threshold, and was assigned a MEDIUM priority. The central station server 604 experienced an increase in data traffic after time 1 while remaining below the lower additional capacity threshold.

The central station server 606 receives a STOP status from the monitoring application server 150. In some examples, the STOP status prevents data traffic from being directed to the central station server 606. The STOP status may indicate that the central station server 606 has ceased processing activity and should not be used. The STOP status may be communicated to the central station server 606 to enable the central station server 606 to determine that the central station server 606 is not being used until it confirms that it is available to process alarm events. The central station server 606 did not receive any further data traffic since time 1.

The central station server 608 receives a HIGH priority assignment from the monitoring application server 150. The graphical representation of the central station server 608 illustrates the change in data traffic through the central station server 608 since time 1. The central station server 608 was below the high additional capacity threshold, and was assigned a HIGH priority. The central station server 608 experienced an increase in data traffic after time 1, exceeding the upper additional capacity threshold, while remaining below the lower additional capacity threshold.

Figure 7:
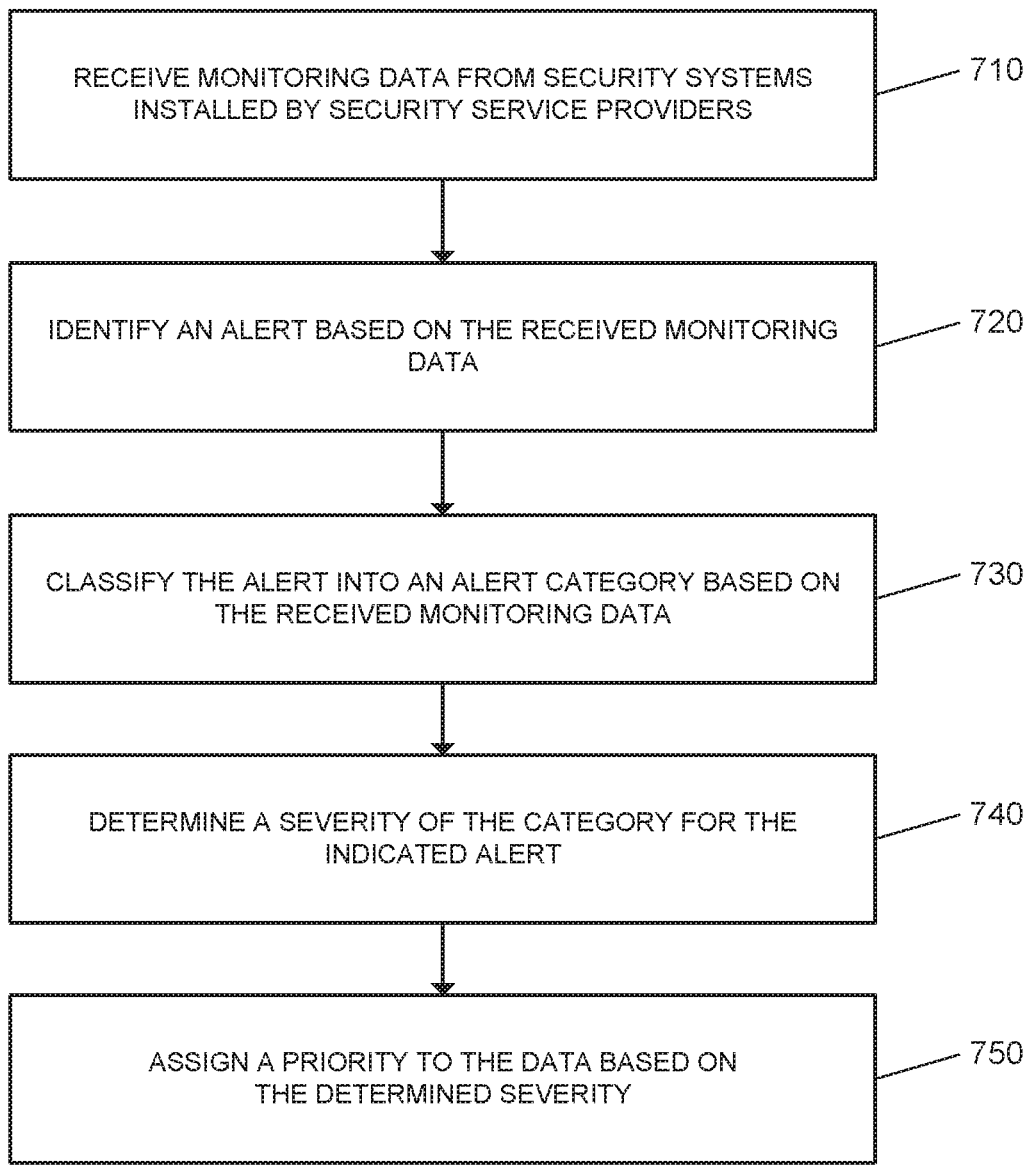

FIG. 7 illustrates an example process 700 that assigns a priority to example monitoring data transmitted between a distributed network of central stations. Briefly, the system 100 receives monitoring data from different security systems (710). The system 100 identifies an alert based on the received monitoring data (720). The system 100 classifies the identified alert into an alert category (730). The system 100 determines a severity for the alert category (740). Finally, the system 100 assigns a priority to the monitoring data based on the determined severity (750).

The operations of the example process 700 are described generally as being performed by the system 100. In some examples, the operations of the example process 700 can be performed by the system 400 and/or its components (e.g., the monitoring application server 150) or can be performed by any combination of the components of the system 400. In some implementations, the operations can be performed by one or more processors included in the one or more electronic devices.

The example process 700 begins when the system 400 receives monitoring data from different security systems installed by security service providers (710). The system 400 identifies an alert based on the received monitoring data (720). For example, the alert can be an alert of a break-in to a home. The alert can be of a fire in a large home with many people inside. The system 400 classifies the alert into an alert category (730). The type of the alert can be determined based on an occupancy status of property, harm that could result from the alert situation, etc. For example, the type of an alert can be determined based on whether lives are in danger, potential for property damage, or simply a component malfunction.

The system 400 then determines a severity of the category of alert (740). The severity of a category can be relative to the severities of the other categories currently active. In some examples, the severity of a category is absolute. For example, an alert for a fire in a high-occupancy building can be assigned a high severity, no matter what other alerts are active. An alert for a door left open can be assigned the highest severity if the other active alerts are alerts, such as a communication failure with a security component that is historically unreliable.

The severity can be determined based on the occupancy, the time-sensitivity, the response time of available units, whether the alert is preventative, etc. In some examples, the severity is based on the monitoring data traffic experienced by the distributed station network 140. For example, if there is a sudden increase in data traffic, the severity of some categories such as no or low-occupancy alerts could be reduced or altered.

The system 400 finally assigns a priority to the monitoring data indicating the alert based on the determined severity (750). In some examples, the priority is relative to the other monitoring data being processed by the system 400. The priority can be based on the monitoring data traffic experienced by the distributed station network 140. The priority can be based on the specific central station server through which the monitoring data traffic is to be directed. For example, data for a specific home can be routed through a central station server based on location. The central station server can suddenly experience an increase in data traffic, and the priority of the alert for the home can be altered.

Figure 8:
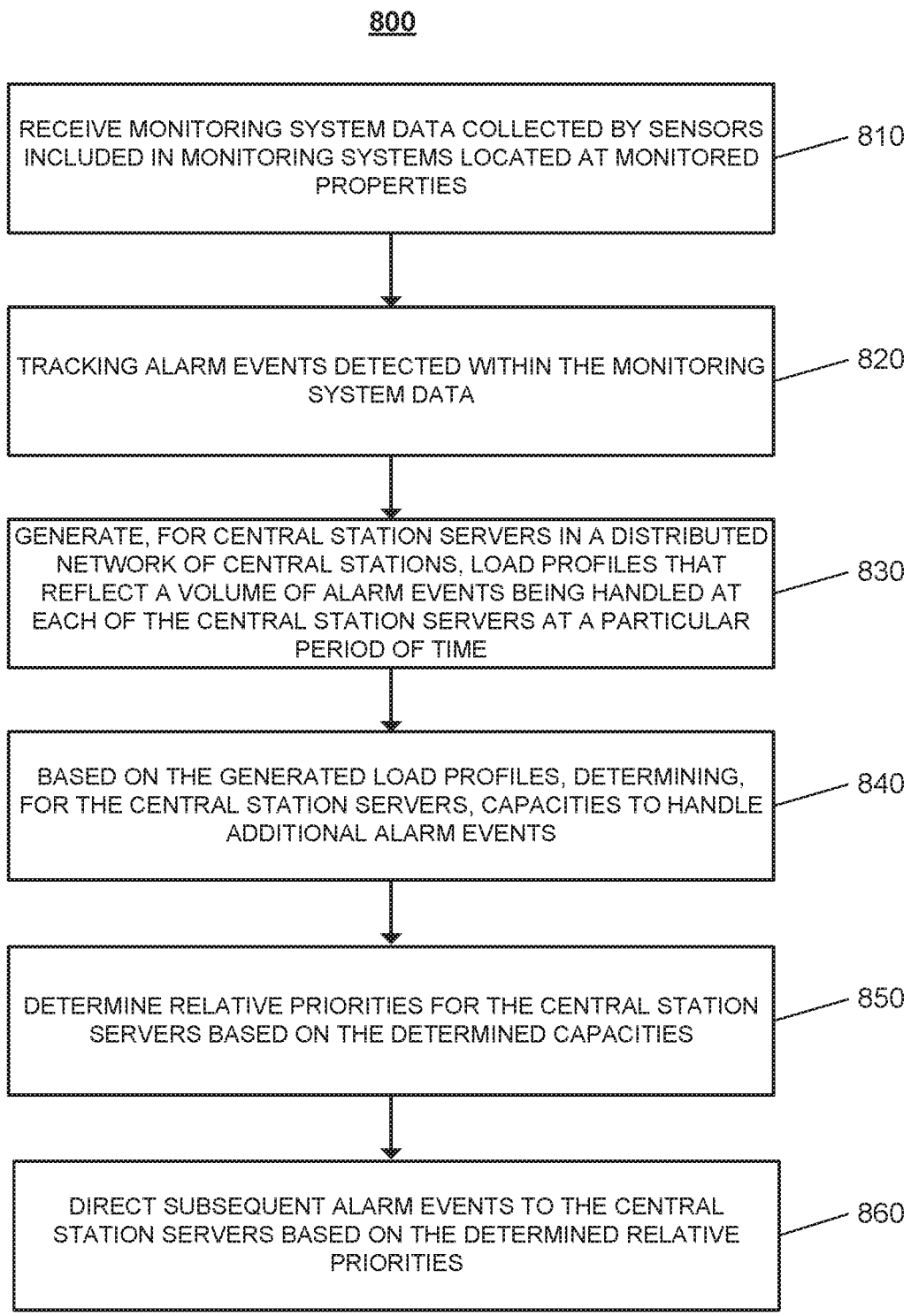

FIG. 8 illustrates an example process 800 for redundantly transmitting example monitoring data between a distributed network of central stations. Briefly, the system 100 receives monitoring system data collected by sensors included in monitoring systems located at monitored properties (810). The system 100 tracks alarm events detected within the monitoring system data (820). The system 100 generates load profiles that reflect a volume of alarm events being handled at each of one or more central station servers (e.g., distributed station network 140) at a particular period of time (830). The system 100 determines a capacity to handle additional alarm events for each central station server on the distributed station network 140 based on the generated load profiles (840). The system 100 determines relative priorities for each central station server based on the determined capacities (850). Finally, the system 100 directs subsequent alarm events to each central station server based on the determined relative priorities (860).

The operations of the example process 800 are described generally as being performed by the system 100. In some examples, the operations of the example process 800 can be performed by the system 400 and/or its components (e.g., the monitoring application server 150) or can be performed by any combination of the components of the system 400. In some implementations, the operations can be performed by one or more processors included in the one or more electronic devices.

The example process 800 begins when the system 400 receives capacity data from different central station servers (810). The system 400 may receive monitoring system data collected by sensors included in monitoring systems located at monitored properties. For example, the system 400 receives a video stream, motion sensor data, door sensor data, etc. from John's house. The system 400 then tracks alarm events detected within the monitoring system data (820). For example, the system 400 may track an alarm event of Break-In Through Back Door detected from the door sensor data received.

Next, the system 400 generates, the central station servers in the distributed network of central stations, load profiles that reflect a volume of alarm events being handled at each of the central station servers at a particular period of time (830). For example, the system 400 may generate a load profile for each central station server for Monday, Feb. 22, 2016. In some examples, the period of time can be selected by a user, predetermined, or calculated by the system 400.

The example process 800 continues when the system 400 determines capacities to handle additional alarm events for the central station servers based on the generated load profiles (840). The system 400 then determines relative priorities for the central station servers based on the determined capacities (850). In some examples, the system 400 may determine relative priorities for each of the remote servers based on comparing the determined capacities to at least one threshold value. The threshold values can be selected by a user, predetermined, or calculated by the system 400. In some examples, the threshold values are dynamically calculated, and are based on the amount of data traffic experienced by the distributed station network 140.

Finally, the system 400 directs subsequent alarm events, transmitted to the system 400 by monitoring systems and devices located at monitored properties, based on the determined relative priorities of each central station server (860). In some examples, the priorities are not transmitted to the central station servers, and are managed by the system 400 for directing data traffic.

The described systems, methods, and techniques may be implemented in digital electronic circuitry, computer hardware, firmware, software, or in combinations of these elements. Apparatus implementing these techniques can include appropriate input and output devices, a computer processor, and a computer program product tangibly embodied in a machine-readable storage device for execution by a programmable processor. A process implementing these techniques can be performed by a programmable processor executing a program of instructions to perform desired functions by operating on input data and generating appropriate output. The techniques can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing can be supplemented by, or incorporated in, specially designed application-specific integrated circuits (ASICs).

It will be understood that various modifications can be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A system for distributing, to a distributed network of central stations, events detected in monitoring system data collected by sensors included in monitoring systems located at monitored properties, the system comprising:
    at least one processor; and
    at least one computer-readable storage medium coupled to the at least one processor having stored thereon instructions which, when executed by the at least one processor, causes the at least one processor to perform operations comprising:
        receiving monitoring data, the monitoring data including data collected by monitoring systems located at monitored properties and data from central stations included in a distributed network of central stations;
        building load profiles for the central stations included in the distributed network of central stations, each of the load profiles reflecting a volume of events being handled by at least one central station of the central stations included in the distributed network of central stations;
        based on the load profiles, determining capacities to handle additional events for the central stations included in the distributed network of central stations;
        based on the determined capacities, determining relative priorities of the central stations included in the distributed network of central stations; and
        based on the relative priorities of the central stations included in the distributed network of central stations, handling transmission of events from the monitored properties to the central stations included in the distributed network of central stations.

2. The system of claim 1, wherein determining relative priorities of the central stations included in the distributed network of central stations is based on comparing the determined capacities to at least one threshold value.

3. The system of claim 1, wherein the relative priorities define an ordering in which events are transmitted to the central stations included in the distributed network of central stations.

4. The system of claim 1, the operations further comprising building a repository of monitoring data.

5. The system of claim 1, wherein determining capacities to handle additional events for the central stations included in the distributed network of central stations comprises:
    calculating a resource availability within the central stations; and
    determining a predicted volume of events based on a log of historical monitoring data transmitted to the central stations.

6. The system of claim 1, wherein determining relative priorities of the central stations included in the distributed network of central stations comprises:
    comparing the determined capacities to handle additional events to a predetermined lower threshold for capacity to handle additional events;
    determining whether the capacities are below the lower threshold; and
    assigning, after determining that the capacity of a first central station of the central stations is below the lower threshold, a low priority to the first central station.

7. The system of claim 6, wherein determining relative priorities of the central stations included in the distributed network of central stations further comprises:
    comparing the determined capacities to handle additional events to a predetermined upper threshold for capacity to handle additional events;
    determining whether the capacities are below the upper threshold; and
    assigning, after determining that the capacity of a second central station of the central stations is below the upper threshold, a medium priority to the second central station.

8. The system of claim 7, wherein determining relative priorities of the central stations included in the distributed network of central stations further comprises:
 determining whether the capacities are above the upper threshold; and
 assigning, after determining that the capacity of a third central station of the central stations is above the upper threshold, a high priority to the third central station.

9. The system of claim 1, the operations further comprising:
 detecting statuses of the central stations;
 determining that a central station of the central stations is operating atypically based on the statuses; and
 ceasing transmission of events to the central station operating atypically.

10. The system of claim 1, the operations further comprising:
 classifying events into categories based on the received monitoring data;
 determining severities for the events based on the categories; and
 assigning priorities to the events based on the determined severities.

11. A method for distributing, to a distributed network of central stations, events detected in monitoring system data collected by sensors included in monitoring systems located at monitored properties, the method comprising:
 receiving monitoring data, the monitoring data including data collected by monitoring systems located at monitored properties and data from central stations included in a distributed network of central stations;
 building load profiles for the central stations included in the distributed network of central stations, each of the load profiles reflecting a volume of events being handled by at least one central station of the central stations included in the distributed network of central stations;
 based on the load profiles, determining capacities to handle additional events for the central stations included in the distributed network of central stations;
 based on the determined capacities, determining relative priorities of the central stations included in the distributed network of central stations; and
 based on the relative priorities of the central stations included in the distributed network of central stations, handling transmission of events from the monitored properties to the central stations included in the distributed network of central stations.

12. The method of claim 11, wherein determining relative priorities of the central stations included in the distributed network of central stations is based on comparing the determined capacities to at least one threshold value.

13. The method of claim 11, wherein the relative priorities define an ordering in which events are transmitted to the central stations included in the distributed network of central stations.

14. The method of claim 11, further comprising building a repository of monitoring data.

15. The method of claim 11, wherein determining capacities to handle additional events for the central stations included in the distributed network of central stations comprises:
 calculating a resource availability within the central stations; and
 determining a predicted volume of events based on a log of historical monitoring data transmitted to the central stations.

16. The method of claim 11, wherein determining relative priorities of the central stations included in the distributed network of central stations comprises:
 comparing the determined capacities to handle additional events to a predetermined lower threshold for capacity to handle additional events;
 determining whether the capacities are below the lower threshold; and
 assigning, after determining that the capacity of a first central station of the central stations is below the lower threshold, a low priority to the first central station.

17. The method of claim 16, wherein determining relative priorities of the central stations included in the distributed network of central stations further comprises:
 comparing the determined capacities to handle additional events to a predetermined upper threshold for capacity to handle additional events;
 determining whether the capacities are below the upper threshold; and
 assigning, after determining that the capacity of a second central station of the central stations is below the upper threshold, a medium priority to the second central station.

18. The method of claim 17, wherein determining relative priorities of the central stations included in the distributed network of central stations further comprises:
 determining whether the capacities are above the upper threshold; and
 assigning, after determining that the capacity of a third central station of the central stations is above the upper threshold, a high priority to the third central station.

19. The method of claim 11, further comprising:
 detecting statuses of the central stations;
 determining that a central station of the central stations is operating atypically based on the statuses; and
 ceasing transmission of events to the central station operating atypically.

20. The method of claim 11, further comprising:
 classifying events into categories based on the received monitoring data;
 determining severities for the events based on the categories; and
 assigning priorities to the events based on the determined severities.

* * * * *

UNITED STATES PATENT AND TRADEMARK OFFICE
CERTIFICATE OF CORRECTION

PATENT NO.         : 9,978,240 B1
APPLICATION NO.    : 15/590147
DATED              : May 22, 2018
INVENTOR(S)        : Stephen Scott Trundle Page 1 of 1

It is certified that error appears in the above-identified patent and that said Letters Patent is hereby corrected as shown below:

On the Title Page

Column 1, (Notice:), Line 3, delete "0 days. days." and insert -- 0 days. --, therefor.

Signed and Sealed this
Sixteenth Day of October, 2018

Andrei Iancu
*Director of the United States Patent and Trademark Office*